US012679104B2

(12) United States Patent
Fujimori

(10) Patent No.: US 12,679,104 B2
(45) Date of Patent: Jul. 14, 2026

(54) LIQUID EJECTION APPARATUS AND CONTROL METHOD FOR LIQUID EJECTION APPARATUS

(71) Applicant: SEIKO EPSON CORPORATION, Tokyo (JP)

(72) Inventor: Ryoji Fujimori, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 160 days.

(21) Appl. No.: 18/484,061

(22) Filed: Oct. 10, 2023

(65) Prior Publication Data

US 2024/0116295 A1 Apr. 11, 2024

(30) Foreign Application Priority Data

Oct. 11, 2022 (JP) ................................ 2022-163105

(51) Int. Cl.

*B41J 2/175* (2006.01)
*B41J 2/045* (2006.01)
*B41J 2/18* (2006.01)
*B41J 2/45* (2006.01)

(52) U.S. Cl.

CPC ....... *B41J 2/17596* (2013.01); *B41J 2/04501* (2013.01); *B41J 2/1752* (2013.01); *B41J 2/18* (2013.01)

(58) Field of Classification Search

CPC .......................................................... B41J 2/18
See application file for complete search history.

(56) References Cited

U.S. PATENT DOCUMENTS

2009/0244226 A1* 10/2009 Hoshino .............. B41J 2/17509 347/92
2011/0211018 A1* 9/2011 Hirosawa ............. B41J 2/16526 347/44

(Continued)

FOREIGN PATENT DOCUMENTS

JP 2011-116102 A 6/2011

*Primary Examiner* — Shelby L Fidler
(74) *Attorney, Agent, or Firm* — WORKMAN NYDEGGER

(57) ABSTRACT

The liquid ejection apparatus includes an ejecting unit configured to eject liquid onto a medium to perform printing on the medium, a supply unit configured to supply the liquid to the ejecting unit, and a control unit, wherein the supply unit includes a mounting unit to and from which a storage unit configured to store the liquid is attachable and detachable, a supply flow path configured to couple the mounting unit and the ejecting unit, a branching flow path configured to branch off from the supply flow path at a branching position and to merge with the supply flow path at a merging position downstream of the branching position, and a pump configured to cause the liquid to flow from the merging position toward the branching position in the branching flow path, and the control unit performs a circulation operation that circulates the liquid in the supply flow path and the branching flow path, and is configured to perform an operation other than an operation of performing printing by ejecting the liquid from the ejecting unit and an operation of attaching and detaching the storage unit to and from the mounting unit as a parallel operation that is performed in parallel with the circulation operation.

12 Claims, 5 Drawing Sheets

(56) References Cited

U.S. PATENT DOCUMENTS

| | | | | |
|---|---|---|---|---|
| 2013/0021396 | A1* | 1/2013 | Hirano | B41J 2/18 347/85 |
| 2017/0210126 | A1* | 7/2017 | Kato | B41J 2/18 |
| 2019/0077164 | A1* | 3/2019 | Yoshida | B41J 2/04586 |
| 2021/0086517 | A1* | 3/2021 | Nakano | B41J 2/0451 |

* cited by examiner

LIQUID EJECTION APPARATUS AND CONTROL METHOD FOR LIQUID EJECTION APPARATUS

The present application is based on, and claims priority from JP Application Serial Number 2022-163105, filed Oct. 11, 2022, the disclosure of which is hereby incorporated by reference herein in its entirety.

BACKGROUND

1. Technical Field

The present disclosure relates to liquid ejection apparatus and a control method for liquid ejection apparatus.

2. Related Art

JP-A-2011-116102 describes a liquid ejection apparatus that circulates liquid between an ejecting unit that ejects liquid and a storage unit that stores the liquid. In the liquid ejection apparatus, sedimentation of the liquid is eliminated by circulating the liquid.

In the liquid ejection apparatus described in JP-A-2011-116102, a user needs to wait until the circulation operation of the liquid is completed. Therefore, the time during the circulation operation is a waiting time for the user. Therefore, there is a problem in terms of user convenience.

SUMMARY

A liquid ejection apparatus that solves the above problems includes an ejecting unit configured to eject liquid onto a medium to perform printing on the medium, a supply unit configured to supply the liquid to the ejecting unit, and a control unit, wherein the supply unit includes a mounting unit to and from which a storage unit configured to store the liquid is attachable and detachable, a supply flow path configured to couple the mounting unit and the ejecting unit, a branching flow path configured to branch off from the supply flow path at a branching position and to merge with the supply flow path at a merging position downstream of the branching position in the supply flow path, and a pump located in the branching flow path and configured to cause the liquid to flow from the merging position toward the branching position in the branching flow path, and the control unit performs a circulation operation that circulates the liquid in the supply flow path and the branching flow path, and is configured to perform, as a parallel operation that is performed in parallel with the circulation operation, an operation other than an operation of performing printing by ejecting the liquid from the ejecting unit and an operation of attaching and detaching the storage unit to and from the mounting unit.

In a control method for a liquid ejection apparatus that solves the above problems including an ejecting unit configured to eject liquid onto a medium to perform printing on the medium, and a supply unit configured to supply the liquid to the ejecting unit, the supply unit including a mounting unit to and from which a storage unit configured to store the liquid is attachable and detachable, a supply flow path configured to couple the mounting unit and the ejecting unit, a branching flow path configured to branch off from the supply flow path at a branching position and to merge with the supply flow path at a merging position downstream of a branching position in the supply flow path, and a pump located in the branching flow path and configured to cause the liquid to flow from the merging position toward the branching position in the branching flow path, the control method includes performing a circulation operation in which the liquid is circulated in the supply flow path and the branching flow path, and enabling execution of, as a parallel operation performed in parallel with the circulation operation, an operation other than an operation of performing printing by ejecting liquid from the ejecting unit and an operation of attaching and detaching the storage unit to and from the mounting unit.

DESCRIPTION OF EMBODIMENTS

With reference to the drawings, an embodiment of liquid ejection apparatus is described below. The liquid ejection apparatus is, for example, an inkjet printer that prints an image such as characters and photographs by ejecting ink, which is an example of a liquid, onto a medium such as paper or cloth.

Liquid Ejection Apparatus

Figure 1:
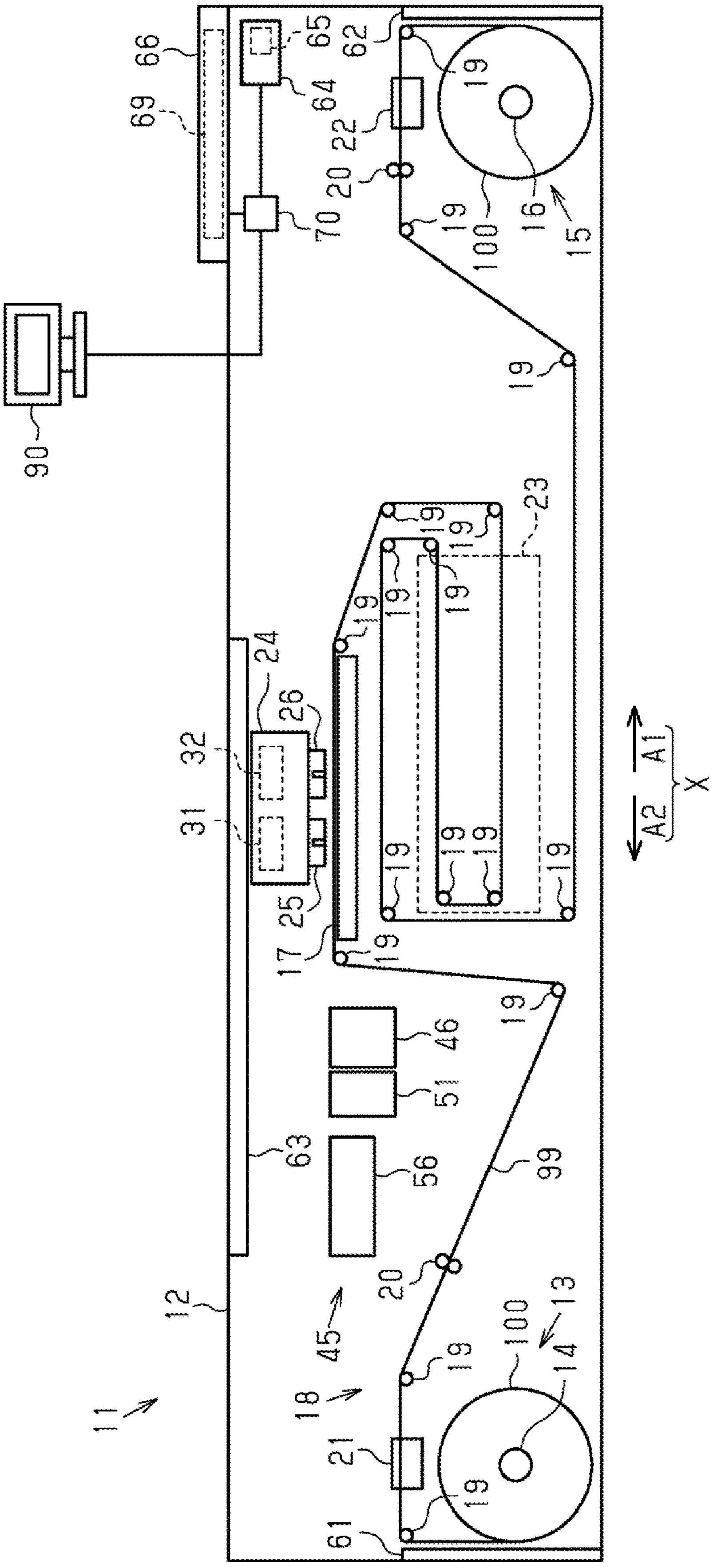
FIG. 1 is a side view illustrating an example of liquid ejection apparatus.

As illustrated in FIG. 1, the liquid ejection apparatus 11 may be configured to communicate with an external device 90. The external device 90 is, for example, a personal computer, a tablet, a smartphone, or the like owned by a user. The liquid ejection apparatus 11 may notify the user of information through the external device 90. The liquid ejection apparatus 11 may receive an operation from the user through the external device 90.

The liquid ejection apparatus 11 includes a housing 12.

The liquid ejection apparatus 11 includes one or more holding units. The liquid ejection apparatus 11 includes, for example, a feeding holding unit 13 and a winding holding unit 15. The holding unit detachably holds a medium 99.

The feeding holding unit 13 is configured to feed the medium 99. The feeding holding unit 13 is located in the housing 12. The feeding holding unit 13 has a feeding shaft 14. The feeding shaft 14 rotatably holds a roll body 100 on which the medium 99 is wound. The feeding shaft 14 holds the medium 99 before printing. As the feeding shaft 14 rotates, the medium 99 is fed from the feeding holding unit 13. The feeding shaft 14 may be driven to rotate by a motor, or may be driven to rotate as the medium 99 is pulled.

The feeding shaft 14 may be configured to be attachable to and detachable from the housing 12. In this case, the roll body 100 can be attached to and detached from the feeding shaft 14 by removing the feeding shaft 14 from the housing 12. That is, the medium 99 can be attached to and detached from the feeding holding unit 13 by removing the feeding shaft 14 from the housing 12. The feeding shaft 14 may be locked in a state in which it is attached to the housing 12. When the roll body 100 is replaced with respect to the feeding holding unit 13, the locking of the feeding shaft 14 is released.

The feeding shaft 14 may be configured to be displaceable in the housing 12. In this case, when the feeding shaft 14 is displaced, the roll body 100 can be attached to and detached from the feeding shaft 14. That is, when the feeding shaft 14 is displaced, the medium 99 can be attached to and detached from the feeding holding unit 13. The feeding shaft 14 may be displaced in order to easily take out the medium 99 from the feeding holding unit 13. For example, when the roll body 100 is replaced in the feeding holding unit 13, the feeding shaft 14 may be displaced to approach a first cover 61 described below.

The winding holding unit 15 is configured to wind the medium 99. The winding holding unit 15 is located in the housing 12. The winding holding unit 15 includes a winding shaft 16. Similarly to the feeding shaft 14, the winding shaft 16 rotatably holds the roll body 100. The winding shaft 16 holds the medium 99 after printing. As the winding shaft 16 rotates, the winding holding unit 15 winds the medium 99. The winding shaft 16 is driven and rotated by, for example, a motor.

The winding shaft 16 is configured to be attachable to and detachable from the housing 12. In this case, the roll body 100 can be attached to and detached from the winding shaft 16 by removing the winding shaft 16 from the housing 12. That is, the medium 99 can be attached to and detached from the winding holding unit 15 by removing the winding shaft 16 from the housing 12. The winding shaft 16 may be locked in a state in which it is attached to the housing 12. When the roll body 100 is collected from the winding holding unit 15, the locking of the winding shaft 16 is released.

The winding shaft 16 may be configured to be displaceable in the housing 12. In this case, the roll body 100 can be attached to and detached from the winding shaft 16 by displacement of the winding shaft 16. That is, the medium 99 can be attached to and detached from the winding holding unit 15 by the displacement of the winding shaft 16. The winding shaft 16 may be displaced in order to easily take out the medium 99 from the winding holding unit 15. For example, when the roll body 100 is collected from the winding holding unit 15, the winding shaft 16 may be displaced to approach a second cover 62 described below.

The liquid ejection apparatus 11 includes a support unit 17. The support unit 17 is located in the housing 12. The support unit 17 supports the medium 99. The support unit 17 supports the medium 99 from below, for example. The support unit 17 supports the medium 99 in a process from when the medium 99 is fed from the feeding holding unit 13 to when the medium 99 is wound by the winding holding unit 15. Liquid is ejected to a region on the medium 99 supported by the support unit 17.

The liquid ejection apparatus 11 includes a transport unit 18. The transport unit 18 is located in the housing 12. The transport unit 18 is configured to transport the medium 99. The transport unit 18 transports the medium 99 from the feeding holding unit 13 toward the winding holding unit 15. For example, the transport unit 18 transports the medium 99 on the support unit 17 in a first direction A1. For example, the transport unit 18 intermittently transports the medium 99. Specifically, the transport unit 18 is stopped while the liquid is ejected to the region on the medium 99 supported by the support unit 17. The transport unit 18 transports the medium 99 after the liquid is ejected to the region on the medium 99 supported by the support unit 17. The transport unit 18 is not limited to transporting a continuous long medium 99 from the roll body 100, and may transport a single-cut medium 99.

The transport unit 18 may include one or more winding rollers 19. The medium 99 is wound around the winding roller 19. A transport path of the medium 99 is formed in the housing 12 by the winding roller 19.

The transport unit 18 may have one or more transport roller pairs 20. For example, the transport unit 18 includes two pairs of transport rollers 20. In one example, the two pairs of transport rollers 20 are located between the feeding holding unit 13 and the support unit 17 and between the support unit 17 and the winding holding unit 15, respectively. The transport roller pair 20 transports the medium 99 by rotating while sandwiching the medium 99.

When the medium 99 is attached to or detached from the holding unit, the transport roller pair 20 may be away from the medium 99. In addition, when the medium 99 is attached to or detached from the holding unit, the transport roller pair 20 may be switched to a state in which the transport roller pair 20 can idle with respect to the medium 99. This is because when the medium 99 is attached to or detached from the holding unit, the winding holding unit 15 needs to wind the medium 99. When the medium 99 is held by the transport roller pair 20, it is difficult for the winding holding unit 15 to wind the medium 99. When the transport roller pair 20 is away from the medium 99 or the transport roller pair 20 is switched to the state in which the transport roller pair 20 can idle with respect to the medium 99, the winding holding unit 15 easily winds the medium 99. Thus, the medium 99 can be easily attached to and detached from the holding unit.

The liquid ejection apparatus 11 includes one or more cutting mechanisms. For example, the liquid ejection apparatus 11 includes a first cutting mechanism 21 and a second cutting mechanism 22. Each of the cutting mechanisms is configured to cut the medium 99. The medium 99 is separated from the roll body 100 by cutting the medium 99 with the cutting mechanism.

The first cutting mechanism 21 is located to cut the medium 99 between the feeding holding unit 13 and the support unit 17. When the first cutting mechanism 21 cuts the medium 99, the roll body 100 held by the feeding holding unit 13 can be taken out. After the first cutting mechanism 21 cuts the medium 99, the winding holding unit 15 winds the medium 99, and thus the roll body 100 held by the winding holding unit 15 can be taken out.

The first cutting mechanism 21 is located, for example, directly above the feeding holding unit 13. Therefore, when the medium 99 is attached to or detached from the feeding holding unit 13, the first cutting mechanism 21 may interfere with the medium 99. In this regard, the first cutting mechanism 21 may be displaced to be away from the feeding holding unit 13 when the medium 99 is attached to or detached from the feeding holding unit 13. Thus, when the medium 99 is attached to or detached from the feeding holding unit 13, the possibility that the first cutting mechanism 21 interferes with the medium 99 is reduced.

The second cutting mechanism 22 is located to cut the medium 99 between the support unit 17 and the winding holding unit 15. The roll body 100 held by the winding holding unit 15 can be taken out by cutting the medium 99 with the second cutting mechanism 22.

The second cutting mechanism 22 is located, for example, directly above the winding holding unit 15. Therefore, when the medium 99 is attached to and detached from the winding holding unit 15, the second cutting mechanism 22 may interfere with the medium 99. In this regard, the second cutting mechanism 22 may be displaced to be away from the winding holding unit 15 when the medium 99 is attached to or detached from the winding holding unit 15. Thus, when the medium 99 is attached to and detached from the winding holding unit 15, the possibility that the second cutting mechanism 22 interferes with the medium 99 is reduced.

The liquid ejection apparatus 11 may include a drying unit 23. The drying unit 23 is configured to dry the medium 99 after printing. The drying unit 23 dries the medium 99 in a process in which the medium 99 is transported from the support unit 17 to the winding holding unit 15. The drying unit 23 is located in the housing 12. The drying unit 23 is located, for example, directly below the support unit 17. The drying unit 23 is, for example, a drying furnace into which the medium 99 transported by the transport unit 18 enters. The drying unit 23 may include a heater that heats the medium 99. The drying unit 23 may include a blower that blows gas onto the medium 99.

The liquid ejection apparatus 11 includes a carriage 24. The carriage 24 is configured to reciprocate in a scanning direction X. The carriage 24 passes through a position at which it faces the support unit 17 by reciprocating in the scanning direction X. The carriage 24 is located, for example, above the support unit 17.

The scanning direction X includes a first direction A1 and a second direction A2. The second direction A2 is opposite to the first direction A1. In the liquid ejection apparatus 11, a direction in which the carriage 24 moves coincides with a direction in which the medium 99 moves on the support unit 17. Thus, the liquid ejection apparatus 11 is a lateral printer. The liquid ejection apparatus 11 may be a serial printer in which the medium 99 is transported in a direction different from the scanning direction X.

Figure 2:
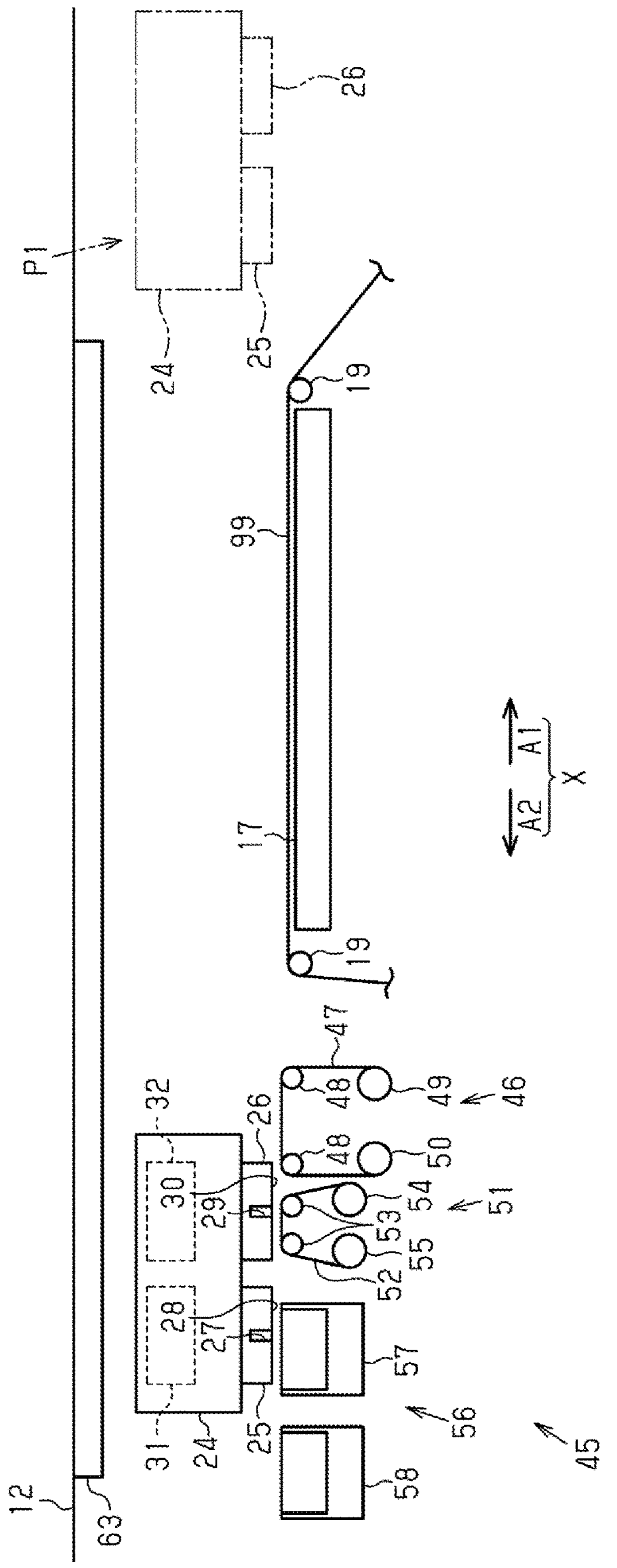
FIG. 2 is a side view illustrating a maintenance unit.

As illustrated in FIG. 2, the liquid ejection apparatus 11 includes one or more ejecting units. The liquid ejection apparatus 11 includes, for example, a first ejecting unit 25 and a second ejecting unit 26. The liquid ejection apparatus 11 may include three or more ejecting units. The ejecting unit prints an image on the medium 99 by ejecting liquid onto the medium 99. The ejecting unit is mounted on the carriage 24. For example, a plurality of ejecting units are arranged in the scanning direction X.

The first ejecting unit 25 is configured to eject liquid on the medium 99. The first ejecting unit 25 has a first nozzle surface 28 in which one or more first nozzles 27 are opened. The first ejecting unit 25 ejects the liquid from the first nozzle 27.

The second ejecting unit 26 is configured to eject liquid on the medium 99. The second ejecting unit 26 has a second nozzle surface 30 in which one or more second nozzles 29 are opened. The second ejecting unit 26 ejects liquid from the second nozzle 29.

The first ejecting unit 25 and the second ejecting unit 26 may eject the same type of liquid or may eject different types of liquids. In one example, the first ejecting unit 25 ejects white ink and the second ejecting unit 26 ejects black ink. When the liquid ejection apparatus 11 includes three or more ejecting units, the other ejecting units eject color ink.

The first ejecting unit 25 and the second ejecting unit 26 eject liquid to the region on the medium 99 supported by the support unit 17. The first ejecting unit 25 and the second ejecting unit 26 are, for example, line heads capable of simultaneously ejecting liquid over the width of the medium 99. The first ejecting unit 25 and the second ejecting unit 26 reciprocate in the scanning direction X together with the carriage 24. Thus, the first ejecting unit 25 and the second ejecting unit 26 can eject the liquid over the entire region on the medium 99 supported by the support unit 17.

The first ejecting unit 25 and the second ejecting unit 26 are displaced to a plurality of positions by moving in the scanning direction X. The first ejecting unit 25 and the second ejecting unit 26 are displaced not only to a position facing the support unit 17 but also to a position not facing the support unit 17. The first ejecting unit 25 and the second ejecting unit 26 may be displaced to a retracted position P1. The retracted position P1 is a position that does not face the support unit 17. Specifically, the retracted position P1 is a position that does not face a maintenance unit 45 described below. In one example, the retracted position P1 is a position shifted in the first direction A1 from the position facing the support unit 17. The first ejecting unit 25 and the second ejecting unit 26 are displaced to the retracted position P1 when a user needs to access the inside of the housing 12 through a third cover 63 described below. In one example, the first ejecting unit 25 and the second ejecting unit 26 are displaced to the retracted position P1 when the user needs to access the support unit 17 or the maintenance unit 45. Thus, the possibility that the user's hand interferes with the first ejecting unit 25 and the second ejecting unit 26 is reduced.

The liquid ejection apparatus 11 includes one or more supply units. The liquid ejection apparatus 11 includes a first supply unit 31 and a second supply unit 32. The liquid ejection apparatus 11 may include three or more supply units. The supply unit is configured to supply liquid to the ejecting unit. The supply unit is mounted on the carriage 24, for example. The supply unit may be mounted in the housing 12.

Figure 3:
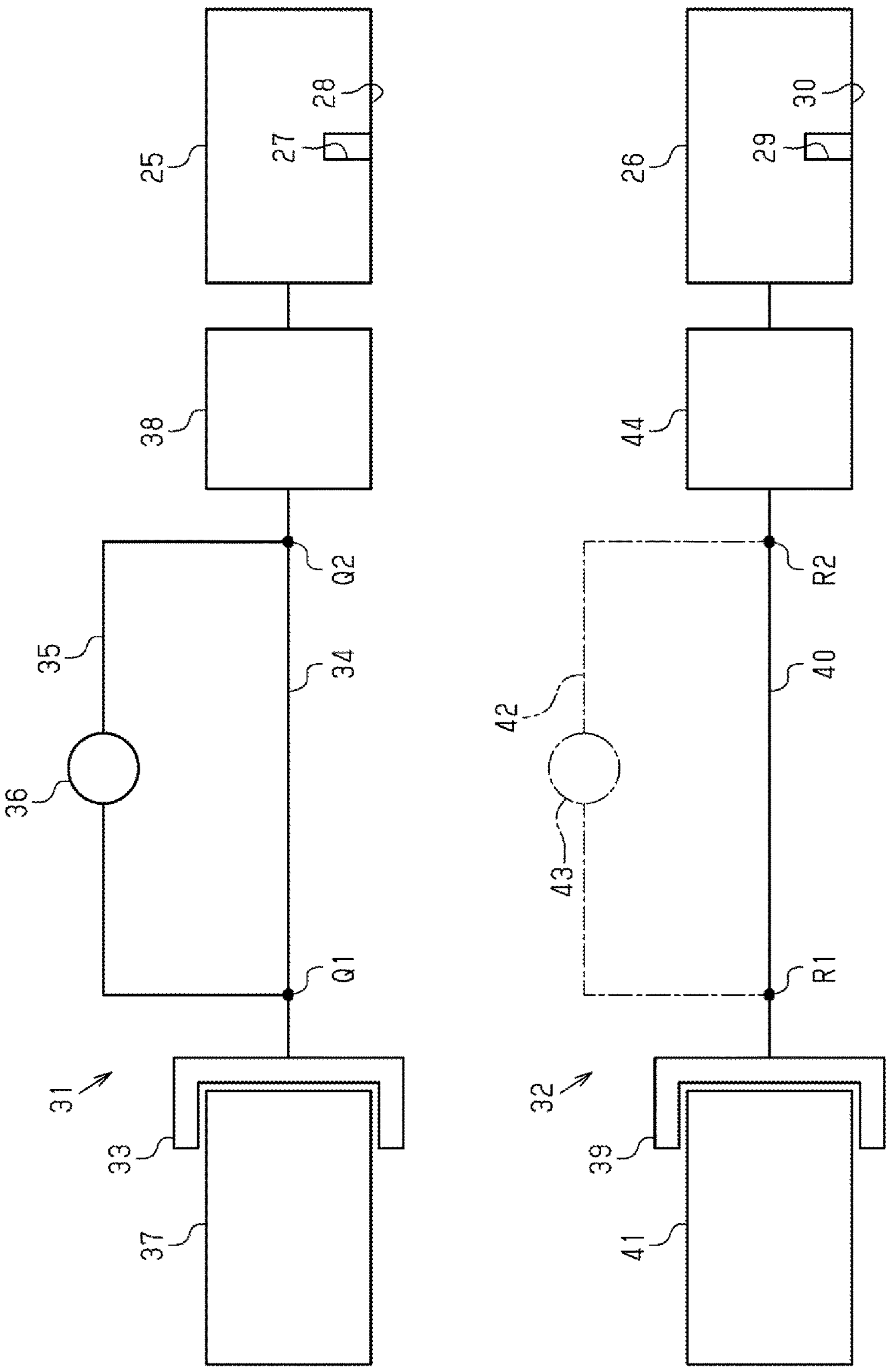
FIG. 3 is a schematic side view illustrating a supply unit.

As shown in FIG. 3, the first supply unit 31 is configured to supply liquid to the first ejecting unit 25. The first supply unit 31 includes a first mounting unit 33, a first supply flow path 34, a first branching flow path 35, and a first pump 36.

The first mounting unit 33 is configured so that a first storage unit 37 is mounted thereon. The first storage unit 37 stores liquid. The first storage unit 37 is, for example, an ink cartridge. Due to the first storage unit 37 being mounted on the first mounting unit 33, the liquid stored in the first storage unit 37 can be supplied to the first ejecting unit 25. The first storage unit 37 is attachable to and detachable from the first mounting unit 33. For example, when an amount of liquid in first storage unit 37 becomes very small, the first storage unit 37 is replaced with respect to the first mounting unit 33.

The first supply flow path 34 is a flow path through which liquid flows. The first supply flow path 34 couples the first mounting unit 33 and the first ejecting unit 25. The first supply flow path 34 includes a tube and a pump, for example. The liquid is supplied from the first storage unit 37 to the first ejecting unit 25 through the first supply flow path 34.

The first branching flow path 35 is a flow path through which liquid flows. The first branching flow path 35 branches off from the first supply flow path 34. Specifically, the first branching flow path 35 branches off from the first supply flow path 34 at a first branching position Q1. The first branching flow path 35 branches off from the first supply flow path 34 and then merges with the first supply flow path 34. Specifically, the first branching flow path 35 merges with the first supply flow path 34 at a first merging position Q2. The first merging position Q2 is a position downstream of the first branching position Q1 in the first supply flow path 34. Therefore, in the first supply flow path 34, a distance between the first merging position Q2 and the first ejecting unit 25 is smaller than a distance between the first branching position Q1 and the first ejecting unit 25.

The first pump 36 is located in the first branching flow path 35. The first pump 36 is a pump that causes the liquid to flow in the first branching flow path 35. Specifically, the first pump 36 causes the liquid to flow from the first merging position Q2 toward the first branching position Q1 in the first branching flow path 35. That is, the first pump 36 returns the liquid from the downstream to the upstream in the first supply flow path 34. Therefore, when the first pump 36 is driven, the liquid circulates in the first supply flow path 34 and the first branching flow path 35. As described above, the operation of circulating the liquid in the supply unit is a circulation operation. The sedimentation of the liquid in the first supply unit 31 is eliminated by the circulation operation. When the liquid stays for a long time, the components contained in the liquid may precipitate. In order to solve this problem, the liquid ejection apparatus 11 appropriately performs the circulation operation.

During the circulation operation of the first supply unit 31, the liquid cannot be supplied from the first storage unit 37 to the first ejecting unit 25. Further, during the circulation operation of the first supply unit 31, the first storage unit 37 cannot be replaced. In addition, during the circulation operation of the first supply unit 31, printing by the first ejecting unit 25 cannot be performed. This is because the pressure in the first ejecting unit 25 becomes unstable during the circulation operation of the first supply unit 31. As described above, a waiting time for the user is generated during the circulation operation of the first supply unit 31. In order to effectively utilize the waiting time, the liquid ejection apparatus 11 can perform a parallel operation together with the circulation operation. The parallel operation will be described in detail below.

The first supply unit 31 may include a first buffer 38. The first buffer 38 is located in the middle of the first supply flow path 34. Specifically, the first buffer 38 is located downstream of the first merging position Q2 in the first supply flow path 34. The first buffer 38 is configured to store the liquid. The liquid stored in the first buffer 38 is appropriately supplied to the first ejecting unit 25 when the amount of liquid in the first ejecting unit 25 decreases. When the first supply unit 31 includes the first buffer 38, the liquid can be supplied from the first buffer 38 to the first ejecting unit 25 even during the circulation operation.

The second supply unit 32 is configured to supply liquid to the second ejecting unit 26. The second supply unit 32 includes a second mounting unit 39 and a second supply flow path 40.

The second mounting unit 39 is configured so that a second storage unit 41 is mounted thereon. The second storage unit 41 stores liquid. The second storage unit 41 is, for example, an ink cartridge. Due to the second storage unit 41 being mounted on the second mounting unit 39, the liquid stored in the second storage unit 41 can be supplied to the second ejecting unit 26. The second storage unit 41 is attachable to and detachable from the second mounting unit 39. For example, when an amount of liquid in second storage unit 41 becomes very small, the second storage unit 41 is replaced with respect to the second mounting unit 39.

The second supply flow path 40 is a flow path through which liquid flows. The second supply flow path 40 couples the second mounting unit 39 and the second ejecting unit 26. The second supply flow path 40 includes, for example, a tube and a pump. The liquid is supplied from the second storage unit 41 to the second ejecting unit 26 through the second supply flow path 40.

The second supply unit 32 may include a second branching flow path 42 and a second pump 43. In this case, the second supply unit 32 can perform the circulation operation similarly to the first supply unit 31.

The second branching flow path 42 is a flow path through which the liquid flows. The second branching flow path 42 branches off from the second supply flow path 40. Specifically, the second branching flow path 42 branches off from the second supply flow path 40 at a second branching position R1. The second branching flow path 42 branches off from the second supply flow path 40 and then merges with the second supply flow path 40. Specifically, the second branching flow path 42 merges with the second supply flow path 40 at a second merging position R2. The second merging position R2 is a position downstream of the second branching position R1 in the second supply flow path 40. Therefore, in the second supply flow path 40, a distance between the second merging position R2 and the second ejecting unit 26 is smaller than a distance between the second branching position R1 and the second ejecting unit 26.

The second pump 43 is located in the second branching flow path 42. The second pump 43 is a pump that causes the liquid to flow in the second branching flow path 42. Specifically, the second pump 43 causes the liquid to flow from the second merging position R2 toward the second branching position R1 in the second branching flow path 42. That is, the second pump 43 returns the liquid from the downstream to the upstream in the second supply flow path 40. Therefore, when the second pump 43 is driven, the liquid circulates in the second supply flow path 40 and the second branching flow path 42.

The second supply unit 32 may include a second buffer 44. The second buffer 44 is located in the middle of the second supply flow path 40. Specifically, the second buffer 44 is located downstream of the second merging position R2 in the second supply flow path 40. The second buffer 44 is configured to store liquid. The liquid stored in the second buffer 44 is appropriately supplied to the second ejecting unit 26 when the liquid amount in the second ejecting unit 26 decreases. When the second supply unit 32 includes the second buffer 44, the liquid can be supplied from the second buffer 44 to the second ejecting unit 26 even during the circulation operation.

As shown in FIG. 2, the liquid ejection apparatus 11 includes the maintenance unit 45. The maintenance unit 45 is configured to perform maintenance for the ejecting unit. The maintenance unit 45 maintains the first ejecting unit 25 and the second ejecting unit 26.

The maintenance unit 45 includes a receiving unit 46. The receiving unit 46 is configured to receive the liquid discharged from the nozzle. That is, the receiving unit 46 receives the liquid discharged from the first nozzle 27. The receiving unit 46 receives the liquid discharged from the second nozzle 29.

The receiving unit 46 receives the liquid discharged from the nozzle by cleaning. The cleaning is an operation for forcibly discharging the liquid from the nozzles, thereby discharging air bubbles, foreign substances, and the like together with the liquid from the ejecting unit. The cleaning is performed by, for example, pressurizing the inside of the ejecting unit by a pressurizing pump (not shown) coupled to the ejecting unit. The receiving unit 46 performs maintenance on the ejecting unit by receiving the liquid discharged by cleaning.

The receiving unit 46 receives the liquid discharged from the nozzle by flushing. The flushing is an operation of ejecting liquid from a nozzle in order to curb clogging of the nozzle. For example, the thickened liquid is discharged from the nozzle by the flushing. The receiving unit 46 maintains the ejecting unit by receiving the liquid discharged by the flushing.

The receiving unit 46 is aligned with the support unit 17 in the scanning direction X, for example. In one example, the receiving unit 46 is located on the side in the second direction A2 from the support unit 17. The receiving unit 46 receives the liquid discharged from the ejecting unit when the ejecting unit is located at a position facing the receiving unit 46. That is, the receiving unit 46 receives the liquid discharged from the first ejecting unit 25 when the first ejecting unit 25 is located at a position facing the receiving unit 46. Thus, the receiving unit 46 performs maintenance on the first ejecting unit 25. The receiving unit 46 receives the liquid discharged from the second ejecting unit 26 when the second ejecting unit 26 is located at a position facing the receiving unit 46. Thus, the receiving unit 46 performs maintenance on the second ejecting unit 26.

The receiving unit 46 has a contact member. The contact member is a member that comes into contact with the liquid discharged from the ejecting unit. The receiving unit 46 includes a receiving member 47 as an example of the contact member. The receiving member 47 is a member that receives the liquid. The receiving member 47 is, for example, cloth. In this case, the receiving member 47 receives the liquid discharged from the nozzle and absorbs the liquid.

The receiving unit 46 has, for example, two holding rollers 48. The receiving member 47 is wound around the two holding rollers 48. Thus, the holding rollers 48 hold the receiving member 47. Since the two holding rollers 48 hold the receiving member 47, a region facing the nozzle surface is formed in the receiving member 47. The receiving member 47 receives the liquid in this region.

The receiving unit 46 includes, for example, a supply roller 49 and a collection roller 50. The supply roller 49 is a roller that supplies an unused receiving member 47. The collection roller 50 is a roller that collects the used receiving member 47. For example, whenever the receiving member 47 receives a certain amount of liquid, the supply roller 49 and the collection roller 50 rotate.

The receiving unit 46 may be maintained by the user. For example, in the receiving unit 46, the receiving member 47 may be replaced. The receiving unit 46 may be displaced when the receiving member 47 is replaced. The receiving unit 46 may be displaced so that the user can easily access the receiving unit 46 when the receiving member 47 is replaced. Thus, it is easy for the user to replace the receiving member 47.

When the receiving member 47 is replaced, the receiving unit 46 is not limited to being displaced automatically, but may be displaced manually by the user. For example, when the receiving member 47 is replaced, the receiving unit 46 may be switched to a displaceable state. The user can replace the receiving member 47 by displacing the receiving unit 46.

The maintenance unit 45 may include a wiping unit 51. The wiping unit 51 wipes the nozzle surface by coming into contact with the nozzle surface. That is, the wiping unit 51 wipes the first nozzle surface 28 by coming into contact with the first nozzle surface 28. The wiping unit 51 wipes the second nozzle surface 30 by coming into contact with the second nozzle surface 30.

The wiping unit 51 wipes the nozzle surface to remove liquid adhering to the nozzle surface. That is, the wiping unit 51 performs wiping on the ejecting unit. The wiping unit 51 performs maintenance on the ejecting unit by wiping the nozzle surface.

The wiping unit 51, for example, wipes the nozzle surface after cleaning. After the cleaning, the liquid adheres to the nozzle surface as the liquid is discharged from the nozzles. Therefore, the wiping unit 51 may wipe the nozzle surface after the cleaning. Thus, the liquid adhering to the nozzle surface is removed.

The wiping unit 51 is aligned with the receiving unit 46 in the scanning direction X, for example. In one example, the wiping unit 51 is located on the side in the second direction A2 from the receiving unit 46. The wiping unit 51 comes into contact with the nozzle surface by approaching the ejecting unit, for example, when the ejecting unit is located at a position facing the wiping unit 51. That is, when the first ejecting unit 25 is located at a position facing the wiping unit 51, the wiping unit 51 comes into contact with the first nozzle surface 28 by approaching the first ejecting unit 25. When the second ejecting unit 26 is located at a position facing the wiping unit 51, the wiping unit 51 comes into contact with the second nozzle surface 30 by approaching the second ejecting unit 26. The wiping unit 51 may come into contact with the nozzle surface by the ejecting unit approaching the wiping unit 51. The wiping unit 51 wipes the nozzle surface by moving relative to the ejecting unit in a state in which the wiping unit 51 is in contact with the nozzle surface.

The wiping unit 51 includes a contact member. The wiping unit 51 includes a wiping member 52 as an example of the contact member. The wiping member 52 is a member that comes into contact with the nozzle surface. The wiping member 52 comes into contact with the liquid discharged from the ejecting unit by coming into contact with the nozzle surface. The wiping member 52 is cloth, for example. The liquid is removed from the nozzle surface by the wiping member 52 absorbing the liquid adhering to the nozzle surface.

The wiping unit 51 has, for example, one or more pressing rollers 53. The pressing rollers 53 are rollers that press the wiping member 52 against the nozzle surface. Thus, the wiping member 52 can be brought into close contact with the nozzle surface.

The wiping unit 51 includes, for example, a feeding roller 54 and a winding roller 55. The feeding roller 54 is a roller that feeds the unused wiping member 52. The winding roller 55 is a roller that winds the used wiping member 52. For example, whenever the wiping member 52 wipes the nozzle surface a predetermined number of times, the feeding roller 54 and the winding roller 55 rotate.

The wiping unit 51 may be maintained by the user. For example, in the wiping unit 51, the wiping member 52 may be replaced. The wiping unit 51 may be displaced when the wiping member 52 is replaced. When the wiping member 52 is replaced, the wiping unit 51 may be displaced so that the user can easily access the wiping unit 51. Thus, the user can easily replace the wiping member 52.

When the wiping member 52 is replaced, the wiping unit 51 is not limited to being displaced automatically, and may be displaced by the user's hand. For example, when the wiping member 52 is replaced, the wiping unit 51 may be switched to a displaceable state. The user can replace the wiping member 52 by displacing the wiping unit 51.

The maintenance unit 45 includes a moisturizing unit 56. The moisturizing unit 56 is configured to moisturize the nozzle by coming into contact with the nozzle surface. That is, the moisturizing unit 56 moisturizes the first nozzle 27 by coming into contact with the first nozzle surface 28. The moisturizing unit 56 moisturizes the second nozzle 29 by coming into contact with the second nozzle surface 30. As a result, the possibility of nozzle clogging is reduced.

The moisturizing unit 56 includes one or more caps. The moisturizing unit 56 includes, for example, a first cap 57 and a second cap 58. The first cap 57 forms a space communicating with the first nozzle 27 by coming into contact with the first nozzle surface 28. That is, the first cap 57 caps the first ejecting unit 25. Thus, the first nozzle 27 is moisturized. The second cap 58 forms a space communicating with the second nozzle 29 by coming into contact with the second nozzle surface 30. That is, the second cap 58 caps the second ejecting unit 26. Thus, the second nozzle 29 is moisturized. In this way, the moisturizing unit 56 maintains the ejecting unit by moisturizing the nozzles.

For example, the moisturizing unit 56 is aligned with the wiping unit 51 in the scanning direction X. In one example, the moisturizing unit 56 is located on the side in the second direction A2 from the wiping unit 51. The first cap 57 is located on the side in the second direction A2 from the second cap 58. For example, when the ejecting unit is located at a position facing the moisturizing unit 56, the moisturizing unit 56 comes into contact with the nozzle surface by approaching the ejecting unit. That is, when the first ejecting unit 25 is located at a position facing the first cap 57, the first cap 57 comes into contact with the first nozzle surface 28 by approaching the first ejecting unit 25. When the second ejecting unit 26 is located at a position facing the second cap 58, the second cap 58 comes into contact with the second nozzle surface 30 by approaching the second ejecting unit 26. The cap may be brought into contact with the nozzle surface by the ejecting unit approaching the moisturizing unit 56.

The first cap 57 and the second cap 58 perform capping when the first ejecting unit 25 and the second ejecting unit 26 are on standby. That is, the first cap 57 and the second cap 58 perform capping when the first ejecting unit 25 and the second ejecting unit 26 do not perform printing, for example, when the first ejecting unit 25 and the second ejecting unit 26 are waiting for input of print data, when the liquid ejection apparatus 11 is powered off, or the like.

The moisturizing unit 56 may be manually maintained by the user. For example, in the moisturizing unit 56, the cap may be cleaned. The moisturizing unit 56 may be displaced so that the user can easily access the moisturizing unit 56 when the cap is cleaned. Thus, it is easier for the user to clean the cap.

When the cap is cleaned, the moisturizing unit 56 is not limited to being displaced automatically, but may be displaced by a user's hand. For example, when the cap is cleaned, the moisturizing unit 56 may be switched to a displaceable state. The user can clean the cap by displacing the moisturizing unit 56.

As illustrated in FIG. 1, the liquid ejection apparatus 11 includes one or more covers. The liquid ejection apparatus 11 includes, for example, a first cover 61, a second cover 62, and a third cover 63. The cover is mounted on the housing 12. The cover can be opened and closed with respect to the housing 12. In FIG. 1, the first cover 61, the second cover 62, and the third cover 63 are closed with respect to the housing 12. The first cover 61, the second cover 62, and the third cover 63 may be normally locked in a closed state. When the user needs to access the inside of the housing 12, the cover is unlocked.

The user can access the inside of the housing 12 by opening the first cover 61. Specifically, the user can access the feeding holding unit 13 through the first cover 61. Therefore, when the user needs to access the feeding holding unit 13, the locking of the first cover 61 is released. For example, when the user replaces the medium 99 with respect to the feeding holding unit 13, the locking of the first cover 61 is released.

The user can access the inside of the housing 12 by opening the second cover 62. Specifically, the user can access the winding holding unit 15 through the second cover 62. Therefore, when the user needs to access the winding holding unit 15, the locking of the second cover 62 is released. For example, when the user replaces the medium 99 with respect to the winding holding unit 15, the locking of the second cover 62 is released.

The user can access the inside of the housing 12 by opening the third cover 63. Specifically, the user can access the support unit 17 and the maintenance unit 45 through the third cover 63. Therefore, when the user needs to access the support unit 17, the maintenance unit 45, or both of them, the locking of the third cover 63 is released. For example, when the user cleans the support unit 17 or maintains the maintenance unit 45, the locking of the third cover 63 is released. The maintenance on the maintenance unit 45 is, for example, replacement of the contact member.

The liquid ejection apparatus 11 includes a control unit 64. The control unit 64 controls the liquid ejection apparatus 11. The control unit 64 controls, for example, the feeding holding unit 13, the winding holding unit 15, the transport unit 18, the cutting mechanism, the drying unit 23, the carriage 24, the ejecting unit, the supply unit, the maintenance unit 45, the cover, and the like.

The control unit 64 may be configured of one or more processors that execute various types of processing according to a computer program. The control unit 64 may be configured of one or more dedicated hardware circuits such as an application specific integrated circuit that executes at least some of various kinds of processing. The control unit 64 may be configured of a circuit including a combination of a processor and a hardware circuit. The processor includes a CPU and memory such as RAM and ROM. The memory stores program codes or commands configured to cause the CPU to execute processing. The memory, that is, a computer-readable medium, includes any readable medium that can be accessed by a general purpose or special purpose computer.

The control unit 64 includes a timer 65. The timer 65 is configured to count time. The timer 65 is, for example, a circuit that counts time. The timer 65 counts, for example, elapsed time from the end of the circulation operation. The timer 65 may count not only the elapsed time but also time elapsed from the end of printing or time in which the power supply is off.

The control unit 64 may perform the circulation operation when the elapsed time is equal to or longer than a threshold value. The threshold value is stored in a memory, for example. Thus, the control unit 64 can perform the circulation operation at predetermined time intervals. The control unit 64 is not limited to the timer 65, and may count the elapsed time by acquiring the time from an external device 90, or may count the elapsed time by acquiring the time through a network.

When the elapsed time is equal to or longer than the threshold value during printing, the control unit 64 may perform the circulation operation after the printing ends. Thus, there is no possibility that printing is interrupted due to the circulation operation. Therefore, printing is smoothly performed.

The control unit 64 may perform the circulation operation not only when the elapsed time elapses but also when a predetermined time elapses from the previous printing. In addition, the control unit 64 may perform the circulation operation when the power supply of the liquid ejection apparatus 11 is turned on from off. When the power is switched from off to on, the liquid is often stagnant for a long time. Therefore, the sedimentation of the liquid is effectively eliminated by the circulation operation.

The control unit 64 may change the length of time in which the circulation operation is continued. Thus, the control unit 64 can change circulation intensity. The control unit 64 increases the circulation intensity by increasing the time of continuing the circulation operation. For example, the control unit 64 may change the length of time in which the circulation operation is continued in accordance with the progress of the sedimentation. In one example, the control unit 64 may change the length of time in which the circulation operation is continued in accordance with the length of time in which the power is off. The control unit 64 may increase the time of continuing the circulation operation as the time in which the power is off increases. As a result, the sedimentation of the liquid is effectively eliminated.

When the circulation operation ends, the control unit 64 may notify the user of the end of the circulation operation. The control unit 64 may notify the user of the end of the circulation operation, for example, by a speaker, a lamp, or the like. Thus, the user can recognize that the circulation operation has ended.

The control unit 64 may notify the user of the end of the circulation operation a predetermined time before the end of the circulation operation. For example, the control unit 64 may notify the user that a remaining time until the circulation operation ends is the predetermined time by a speaker, a lamp, or the like. Thus, the user can grasp the remaining time until the circulation operation ends.

During the circulation operation, the control unit 64 may detect the presence or absence of the medium 99 in the holding unit, an amount of the medium 99 in the holding unit, and the like. That is, the control unit 64 may detect whether or not the roll body 100 is mounted in the feeding holding unit 13, or may detect an amount of the roll body 100 mounted in the feeding holding unit 13. The control unit 64 detects the presence or absence of the medium 99 and the amount of the medium 99 using, for example, a weight sensor, an optical sensor, or the like. When the medium 99 is not present in the holding unit and when the amount of the medium 99 in the holding unit is small, the control unit 64 may notify the user of the fact. For example, the control unit 64 may prompt the user to replenish the medium 99.

During the circulation operation, the control unit 64 may detect the degree of contamination of the contact member, a remaining amount of the contact member, and the like. That is, the control unit 64 may detect the degree of contamination of the receiving member 47, a remaining amount of the receiving member 47, the degree of contamination of the wiping member 52, a remaining amount of the wiping member 52, and the like. When the contact member is contaminated or when the remaining amount of the contact member is small, the control unit 64 may notify the user of the fact. For example, the control unit 64 may prompt the user to replace the contact member.

The liquid ejection apparatus 11 includes a display unit 66. The display unit 66 displays information. The display unit 66 is a liquid crystal display, for example. The display unit 66 may display information notified by the control unit 64. The display unit 66 may display information relating to the circulation operation. The information related to the circulation operation is, for example, a time until the circulation operation ends. During the circulation operation, the display unit 66 may display, for example, the length of time required for the circulation operation, a remaining time until the circulation operation ends, a time when the circulation operation ends, and the like.

The display unit 66 may display a permission screen. The permission screen is a screen for obtaining permission to perform the circulation operation from the user. For example, when the elapsed time is equal to or longer than the threshold value, the display unit 66 displays the permission screen. When the user gives permission on the permission screen, the circulation operation may be performed. When the elapsed time is equal to or longer than the threshold value, the circulation operation may be automatically performed.

Figure 4:
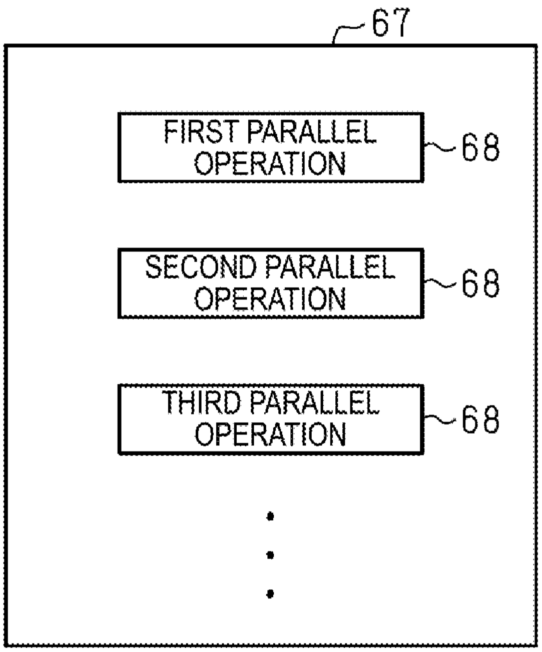
FIG. 4 is a schematic diagram illustrating an example of a selection screen.

As shown in FIG. 4, the display unit 66 may display information of the parallel operation. The display unit 66 may display, for example, a selection screen 67. The selection screen 67 is a screen on which the parallel operation is selected. A list of parallel operations is displayed on the selection screen 67. The selection screen 67 is displayed during the circulation operation.

For example, one or more parallel operation buttons 68 are displayed on the selection screen 67. The parallel operation button 68 is a button corresponding to the parallel operation. When the user selects the parallel operation button 68, the parallel operation corresponding to the selected parallel operation button 68 is performed. Thus, the parallel operation desired by the user is performed. For example, the user selects the parallel operation based on information notified by the control unit 64. The parallel operation selected by the user is not necessarily performed, and for example, a preset parallel operation may be automatically performed.

In the selection screen 67, only the parallel operation buttons 68 corresponding to performable parallel operations among the plurality of parallel operations may be displayed. For example, in the selection screen 67, only the parallel operation buttons 68 corresponding to the parallel operations of which required time is relatively shorter than the time required for the circulation operation may be displayed. This is because, when the parallel operation having a relatively long required time is selected, the parallel operation may not end until the circulation operation ends.

In the selection screen 67, all the parallel operation buttons 68 may be displayed. In this case, in the selection screen 67, only the parallel operation buttons 68 corresponding to the performable parallel operations among the plurality of parallel operations may be displayed to be selectable. For example, in the selection screen 67, only the parallel operation buttons 68 corresponding to the parallel operations of which required time is relatively shorter than the time required for the circulation operation may be displayed to be selected.

In the selection screen 67, the parallel operation buttons 68 corresponding to recommended parallel operations may be displayed in accordance with the time required for the circulation operation. For example, in the selection screen 67, the parallel operation buttons 68 corresponding to the recommended parallel operations among the plurality of parallel operations may be displayed so as to be emphasized as compared with the other parallel operation buttons 68. In the selection screen 67, the parallel operation buttons 68 corresponding to the recommended parallel operations among the plurality of parallel operations may be displayed in order from the top.

The selection screen 67 may be displayed on the external device 90. In this case, for example, a driver stored in the external device 90 displays the selection screen 67. The control unit 64 performs the parallel operation selected by the user in the external device 90.

As illustrated in FIG. 1, the liquid ejection apparatus 11 includes an operation unit 69. The operation unit 69 is configured to be operated by the user. The operation unit 69 is, for example, a touch panel. The operation unit 69 may be a button, a lever, a switch, or the like. The user operates the liquid ejection apparatus 11 by operating the operation unit 69. The user selects the parallel operation from the selection screen 67 by operating the operation unit 69, for example.

The liquid ejection apparatus 11 includes a reception unit 70. The reception unit 70 is configured to receive an operation from the user. The reception unit 70 is coupled to the operation unit 69. The reception unit 70 is coupled to the external device 90. The reception unit 70 is, for example, an interface for communication.

The reception unit 70 receives an operation from the operation unit 69. The reception unit 70 receives an operation from the external device 90. Specifically, the reception unit 70 receives selection of the parallel operation by the user. That is, the reception unit 70 receives a performing command of the parallel operation selected by the user on the selection screen 67. The control unit 64 performs the parallel operation received by the reception unit 70.

Parallel Operation

Next, the parallel operation will be described.

The parallel operation during the circulation operation of the first supply unit 31 is an operation other than an operation of performing printing by ejecting liquid from the first ejecting unit 25 and an operation of attaching and detaching the first storage unit 37 to and from the first mounting unit 33. During the circulation operation of the first supply unit 31, since the ejection of the liquid by the first ejecting unit 25 becomes unstable, the operation of performing printing by ejecting the liquid from the first ejecting unit 25 cannot be performed. During the circulation operation of the first supply unit 31, since the liquid may leak from first mounting unit 33, the operation of attaching and detaching the first storage unit 37 to and from the first mounting unit 33 cannot be performed. Therefore, printing using white ink cannot be performed during the circulation operation of the first supply unit 31. In the selection screen 67, the user can select an operation other than the operation of performing printing by ejecting liquid from the first ejecting unit 25 and the operation of attaching and detaching the first storage unit 37 to and from the first mounting unit 33.

The parallel operation during the circulation operation of the second supply unit 32 is an operation other than an operation of performing printing by ejecting liquid from the second ejecting unit 26 and an operation of attaching and detaching the second storage unit 41 to and from the second mounting unit 39. During the circulation operation of the second supply unit 32, since the ejection of the liquid by the second ejecting unit 26 becomes unstable, the operation of performing printing by ejecting the liquid from the second ejecting unit 26 cannot be performed. During the circulation operation of second supply unit 32, since the liquid may leak from the second mounting unit 39, the operation of attaching and detaching the second storage unit 41 to and from the second mounting unit 39 cannot be performed. Therefore, during the circulation operation of the second supply unit 32, printing using black ink cannot be performed. In the selection screen 67, the user can select an operation other than the operation of performing printing by ejecting liquid from the second ejecting unit 26 and the operation of attaching and detaching the second storage unit 41 to and from the second mounting unit 39.

Most of the parallel operations performable during the circulation operation of the second supply unit 32 are common to the parallel operations performable during the circulation operation of the first supply unit 31. Therefore, hereinafter, the parallel operation during the circulation operation of the first supply unit 31 will be mainly described.

The parallel operation may be, for example, a preparation operation for attaching and detaching the medium 99 to and from the holding unit. The preparation operation is an operation relating to attachment and detachment of the medium 99, that is, an attachment and detachment preparation operation. For example, when the parallel operation button 68 indicating the attachment and detachment of the medium 99 is selected in the selection screen 67, the control unit 64 performs the attachment and detachment preparation operation in parallel with the circulation operation.

The attachment and detachment preparation operation includes operations of releasing the locking of the first cover 61, releasing the locking of the second cover 62, separating the transport roller pair 20 from the medium 99, switching the transport roller pair 20 to an idleable state, cutting the medium 99 by the first cutting mechanism 21, cutting the medium 99 by the second cutting mechanism 22, winding the medium 99 by the winding holding unit 15, displacing the first cutting mechanism 21, displacing the second cutting mechanism 22, releasing the locking of the feeding shaft 14, displacing the feeding shaft 14, releasing the locking of the winding shaft 16, displacing the winding shaft 16, and the like. The control unit 64 performs one or more of the above-described operations in parallel with the circulation operation. Due to the attachment and detachment preparation operation being performed, the user can attach and detach the medium 99 to and from the holding unit. Therefore, the user can effectively utilize the waiting time due to the circulation operation.

The parallel operation may be, for example, an access operation for the user to access the support unit 17, the maintenance unit 45, or both of them. The access operation is performed, for example, in order for the user to perform maintenance on the support unit 17, the maintenance unit 45, or both of them. For example, when the parallel operation button 68 indicating maintenance on the support unit 17 or the maintenance unit 45 is selected in the selection screen 67, the control unit 64 performs the access operation in parallel with the circulation operation.

The access operation includes operations of releasing the locking of the third cover 63, displacing the ejecting unit to the retracted position P1, displacing the receiving unit 46, releasing the locking of the receiving unit 46, displacing the wiping unit 51, releasing the locking of the wiping unit 51, releasing the locking of the moisturizing unit 56, displacing the moisturizing unit 56, winding the media 99 by the winding holding unit 15, and the like. The control unit 64 performs one or more of the above-described operations in parallel with the circulation operation. In the access operation, since the medium 99 is not located on the support unit 17 by winding the medium 99 with the winding holding unit 15, the user can easily perform maintenance on the support unit 17. Due to the access operation being performed, the user can access the support unit 17, the maintenance unit 45, or both of them. As a result, the user can perform maintenance on the support unit 17, the maintenance unit 45, or both of them. Specifically, the user can clean the support unit 17, the maintenance unit 45, or both of them. Therefore, the user can effectively utilize the waiting time due to the circulation operation.

The parallel operation may be, for example, a preparation operation for replacing the contact member. This preparation operation is an operation relating to replacement of the contact member, that is, a replacement preparation operation. For example, when the parallel operation button 68 indicating the replacement of the contact member is selected in the selection screen 67, the control unit 64 performs the replacement preparation operation in parallel with the circulation operation.

The replacement preparation operation includes operations of releasing the locking of the third cover 63, displacing the ejecting unit to the retracted position P1, displacing the receiving unit 46, releasing the locking of the receiving unit 46, displacing the wiping unit 51, releasing the locking of the wiping unit 51, and the like. The control unit 64 performs one or more of the above-described operations in parallel with the circulation operation. Due to the replacement preparation operation being performed, the user can replace the contact member. Specifically, the user can replace the receiving member 47, the wiping member 52, or both of them. Therefore, the user can effectively utilize the waiting time due to the circulation operation.

The parallel operation may be, for example, an operation of performing printing on the medium 99 by causing the second ejecting unit 26 to eject liquid onto the medium 99. During the circulation operation of the first supply unit 31, printing by the second ejecting unit 26 is possible while printing by the first ejecting unit 25 is not possible. Therefore, during the circulation operation, for example, when it is determined that the first ejecting unit 25 is not used for printing, the control unit 64 can perform printing by the second ejecting unit 26. The control unit 64 determines whether or not to use the first ejecting unit 25 for printing based on the print data. For example, when the parallel operation button 68 indicating printing by the second ejecting unit 26 is selected in the selection screen 67, the control unit 64 performs the operation of performing printing by the second ejecting unit 26 in parallel with the circulation operation.

The control unit 64 may perform printing by the second ejecting unit 26 when it is determined that the circulation operation ends until printing by the second ejecting unit 26 ends. When printing is performed by the second ejecting unit 26, the first ejecting unit 25 does not eject liquid onto the medium 99, but ejects liquid into the receiving unit 46. That is, the first ejecting unit 25 performs flushing together with the second ejecting unit 26. Therefore, the liquid in the first ejecting unit 25 is consumed together with printing by the second ejecting unit 26. When the circulation operation does not end until the printing by the second ejecting unit 26 ends, the liquid is not supplied from the first storage unit 37 to the first ejecting unit 25 during the printing by the second ejecting unit 26. Therefore, there is the possibility that the amount of liquid in the first ejecting unit 25 may become small. On the other hand, when the circulation operation ends until the printing by the second ejecting unit 26 ends, the liquid is supplied from the first storage unit 37 to the first ejecting unit 25 from the middle of the printing by the second ejecting unit 26. Therefore, it is possible to reduce the possibility that the amount of liquid in the first ejecting unit 25 becomes small.

During the circulation operation, an amount of liquid that can be consumed by the flushing of the first ejecting unit 25 depends on a capacity of the first buffer 38. Therefore, when a flushable time of the first ejecting unit 25 is longer than a time required for printing by the second ejecting unit 26, the control unit 64 may perform printing by the second ejecting unit 26 in parallel with the circulation operation. The flushable time is calculated, for example, by dividing the capacity of the first buffer 38 by a rate of consumption of liquid by flushing.

Flowchart

Next, an example of a circulation operation process performed by the control unit 64 will be described. The circulation operation process is a process of performing the circulation operation. The circulation operation process includes a process of performing the parallel operation. For example, when the elapsed time is equal to or longer than a threshold value, the control unit 64 starts the circulation operation process.

Figure 5:
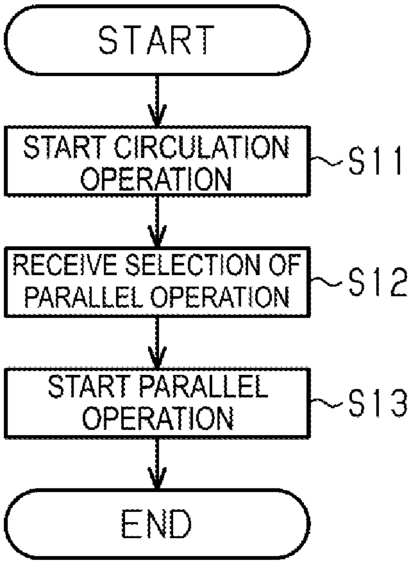
FIG. 5 is a flowchart illustrating an example of a circulation operation process.

As shown in FIG. 5, the control unit 64 performs the circulation operation at Step S11. For example, the control unit 64 performs the circulation operation in the first supply unit 31.

In Step S12, the control unit 64 receives the selection of the parallel operation by the user. At this time, the control unit 64 receives the performing command of the parallel operation from the operation unit 69 or the external device 90 through the reception unit 70.

In Step S13, the control unit 64 performs the parallel operation. At this time, the control unit 64 performs the parallel operation selected by the user in Step S12. In parallel with the circulation operation, the control unit 64 performs operations other than the operations of performing printing by ejecting liquid from the first ejecting unit 25 and the operation of attaching and detaching the first storage unit 37 to and from the first mounting unit 33.

When the circulation operation and the parallel operation end, the control unit 64 ends the circulation operation process. When the circulation operation is continued at a time point when the parallel operation ends, the control unit 64 may newly receive a performing command of the parallel operation.

Functions and Effects

Next, the functions and effects of the embodiment described above will be described.

(1) The control unit 64 is configured to perform operations other than the operation of performing printing by ejecting liquid from the ejecting unit and the operation of attaching and detaching the storage unit to and from the mounting unit as the parallel operations performed in parallel with the circulation operation. According to the above configuration, since the parallel operation is performed in parallel with the circulation operation, the time required for the circulation operation can be effectively utilized. Thus, convenience for the user is further enhanced.

(2) The control unit 64 performs the parallel operation received by the reception unit 70.

According to the above configuration, the parallel operation selected by the user is executed in parallel with the circulation operation. Thus, convenience for the user is further enhanced.

(3) The control unit 64 performs the circulation operation when the power supply of the liquid ejection apparatus 11 is switched from off to on.

While the power supply is off, sedimentation of the liquid progresses. Therefore, according to the above configuration, the sedimentation of the liquid is effectively eliminated.

(4) The control unit 64 changes the length of time in which the circulation operation is continued in accordance with the length of time in which the power supply of the liquid ejection apparatus 11 is off.

As the time in which the power supply is off becomes longer, the sedimentation of the liquid further progresses. For this reason, according to the above configuration, for example, as the power-off time becomes longer, the control unit 64 increases the time in which the circulation operation is continued. As a result, the sedimentation of the liquid is effectively eliminated.

(5) The control unit 64 performs the circulation operation when a time elapsed from the end of the previous circulation operation is equal to or longer than a threshold value.

When a time elapses from the previous circulation operation, the sedimentation of the liquid progresses again. Therefore, according to the above configuration, the sedimentation of the liquid is effectively eliminated.

(6) When the time elapsed from the end of the previous circulation operation during printing is equal to or longer than a threshold value, the control unit 64 performs the circulation operation after the end of printing.

According to the above configuration, since the printing is not interrupted by the circulation operation, the printing is smoothly performed.

(7) The liquid ejection apparatus 11 includes the display unit 66 that displays the time until the circulation operation ends.

According to the above configuration, the user can grasp the time required for the circulation operation. Thus, the user can effectively utilize the waiting time due to the circulation operation.

(8) The parallel operation is a preparation operation for attaching and detaching the medium 99 to and from the holding unit.

According to the above configuration, the user can attach and detach the medium 99 to and from the holding unit in parallel with the circulation operation. Thus, the user can effectively utilize the waiting time.

(9) The parallel operation is a preparation operation for replacing the contact member.

According to the above configuration, the user can replace the contact member in parallel with the circulation operation. Thus, the user can effectively utilize the waiting time.

(10) The parallel operation is an operation in which the ejecting unit is retracted in order for the user to access the maintenance unit 45.

When the user accesses the maintenance unit 45, the user's hand may interfere with the ejecting unit. Thus, according to the above configuration, the user's hand is less likely to interfere with the ejecting unit by retracting the ejecting unit. Thus, the user can maintain, for example, the maintenance unit 45 in parallel with the circulation operation.

(11) The control unit 64 is configured to perform operations other than the operation of performing printing by ejecting liquid from the first ejecting unit 25 and the operation of attaching and detaching the first storage unit 37 to and from the first mounting unit 33 as the parallel operation. According to the above configuration, since the parallel operation is performed in parallel with the circulation operation, the time required for the circulation operation can be effectively utilized. Thus, convenience for the user is further enhanced.

(12) The parallel operation is an operation of performing printing on the medium 99 by ejecting liquid from the second ejecting unit 26 onto the medium 99.

According to the above configuration, it is possible to perform printing by the second ejecting unit 26 in parallel with the circulation operation. Thus, the user can effectively use the time required for the circulation operation.

(13) When it is determined that the circulation operation ends until the operation of performing printing on the medium 99 by ejecting liquid from the second ejecting unit 26 onto the medium 99 ends, the control unit 64 performs the operation of performing printing on the medium 99 by ejecting liquid from the second ejecting unit 26 onto the medium 99 as the parallel operation.

In the liquid ejection apparatus 11, normally, the ejecting unit appropriately ejects liquid during printing in order to curb clogging of the nozzles. However, during the circulation operation, the first supply unit 31 cannot supply the liquid from the first storage unit 37 to the first ejecting unit 25. Therefore, when the second ejecting unit 26 performs printing on the medium 99 in parallel with the circulation operation, there is a possibility that the amount of liquid in the first ejecting unit 25 may become very small due to the first ejecting unit 25 ejecting liquid as appropriate together with the second ejecting unit 26. In particular, as the time required for printing by the second ejecting unit 26 is increased, the liquid in the first ejecting unit 25 is further consumed. In this regard, according to the above configuration, when the circulation operation ends until the printing by the second ejecting unit 26 ends, it is possible to supply the liquid from the first storage unit 37 to the first ejecting unit 25 after the circulation operation ends. Therefore, it is possible to reduce the possibility that the amount of liquid in the first ejecting unit 25 becomes small.

Modified Examples

The above-described embodiment may be modified for implementation as follows. The above-described embodiment and the following modified examples may be combined with each other for implementation in so far as they are not technically inconsistent.

Figure 6:
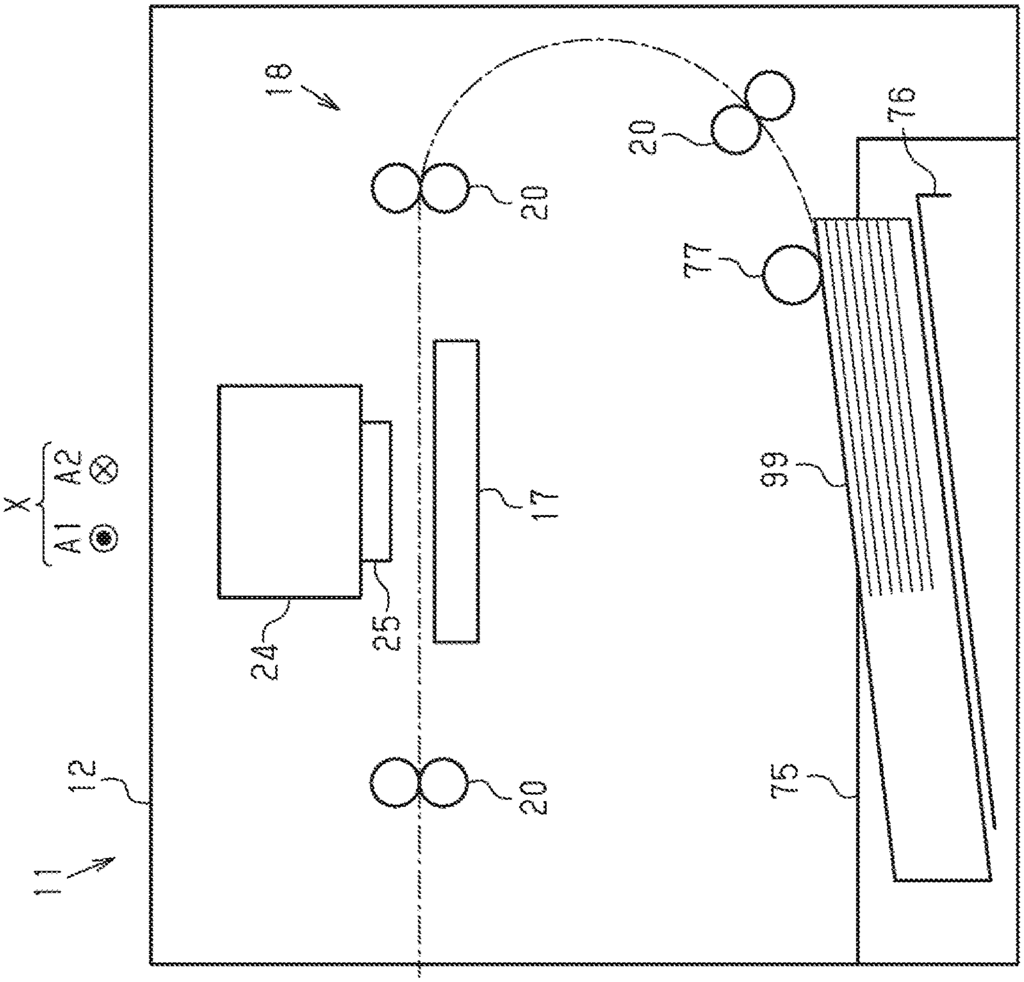
FIG. 6 is a side view illustrating a modified example of the liquid ejection apparatus.

As shown in FIG. 6, the liquid ejection apparatus 11 may be configured to perform printing on the medium 99 in the form of a cut sheet by ejecting liquid onto the medium 99. In this modified example, the liquid ejection apparatus 11 includes an accommodation holding unit 75 as an example of the holding unit.

The accommodation holding unit 75 is configured to hold a plurality of media 99 in a stacked state. The accommodation holding unit 75 is, for example, a cassette that can be attached to and detached from the housing 12. The accommodation holding unit 75 may be locked in a state in which it is attached to the housing 12. When it is necessary to remove the accommodation holding unit 75, the locking is released.

The accommodation holding unit 75 includes a hopper 76 that supports the medium 99 from below. The hopper 76 is vertically displaceable. When the accommodation holding unit 75 is attached to the housing 12, the hopper 76 is displaced upward. As a result, the hopper 76 presses the medium 99 against the transport unit 18. When the accommodation holding unit 75 is removed from the housing 12, the hopper 76 is displaced downward.

The transport unit 18 includes a pick roller 77. The pick roller 77 is a roller that transports the media 99 held by the accommodation holding unit 75 one by one. The medium 99 supported by the hopper 76 is pressed against the pick roller 77. The pick roller 77 may be configured to be displaced between a position in contact with the medium 99 and a position away from the medium 99. When the accommodation holding unit 75 is attached to the housing 12, the pick roller 77 is located at a position at which the pick roller 77 comes into contact with the medium 99. When the accommodation holding unit 75 is removed from the housing 12, the pick roller 77 is located at a position away from the medium 99.

In this modified example, an attachment and detachment preparation operation is, for example, an operation of releasing the locking of the accommodation holding unit 75, causing the accommodation holding unit 75 to be jumped out of the housing 12, displacing the hopper 76 downward, separating the pick roller 77 from the medium 99, or the like. The control unit 64 performs one or more of the above operations in parallel with the circulation operation. Due to the attachment and detachment preparation operation being performed, the user can attach and detach the medium 99 to and from the holding unit. Therefore, the user can effectively utilize the waiting time due to the circulation operation.

In the receiving unit 46, the contact member, that is, the receiving member 47, may be a box for receiving the liquid. In this case, the moisturizing unit 56 may also serve as the receiving unit 46. That is, the cap corresponds to the contact member. Furthermore, the maintenance unit 45 may include a waste liquid collecting body that collects the liquid received by the receiving member 47. The control unit 64 may perform an operation for replacing the waste liquid collecting body as the parallel operation. The operation for replacing the waste liquid collecting body is, for example, an operation of releasing the locking of the waste liquid collecting body, releasing the locking of a cover for protecting the waste liquid collecting body, or the like.

In the wiping unit 51, the contact member, that is, the wiping member 52 may be a blade wiper made of a resin.

The liquid ejected by the ejecting unit is not limited to ink, and may be, for example, liquid material including particles of a functional material dispersed or mixed in liquid. For example, the ejecting unit may eject liquid material including a material such as an electrode material or a pixel material used in manufacture of liquid crystal display, an electroluminescent (EL) display, and a surface emitting display in a dispersed or dissolved form.

Technical Idea

Hereinafter, technical concepts and effects thereof that are understood from the above-described embodiments and modified examples will be described.

(A) The liquid ejection apparatus includes an ejecting unit configured to eject liquid onto a medium to perform printing on the medium, a supply unit configured to supply the liquid to the ejecting unit, and a control unit, wherein the supply unit includes a mounting unit to and from which a storage unit configured to store the liquid is attachable and detachable, a supply flow path configured to couple the mounting unit and the ejecting unit, a branching flow path configured to branch off from the supply flow path at a branching position and to merge with the supply flow path at a merging position downstream of the branching position in the supply flow path, and a pump located in the branching flow path and configured to cause the liquid to flow from the merging position toward the branching position in the branching flow path, and the control unit performs a circulation operation that circulates the liquid in the supply flow path and the branching flow path, and is configured to perform, as a parallel operation that is performed in parallel with the circulation operation, an operation other than an operation of performing printing by ejecting the liquid from the ejecting unit and an operation of attaching and detaching the storage unit to and from the mounting unit. According to the above configuration, since the parallel operation is performed in parallel with the circulation operation, the time required for the circulation operation can be effectively utilized. Thus, convenience for the user is further enhanced.

(B) The liquid ejection apparatus may further include a reception unit configured to receive selection of the parallel operation by a user, and the control unit may perform the parallel operation received by the reception unit.

According to the above configuration, the parallel operation selected by the user is performed in parallel with the circulation operation. Thus, convenience for the user is further enhanced.

(C) In the liquid ejection apparatus, the control unit may perform the circulation operation when a power supply of the liquid ejection apparatus is turned on from off.

While the power supply is off, sedimentation of the liquid progresses. Therefore, according to the above configuration, the sedimentation of the liquid is effectively eliminated.

(D) In the liquid ejection apparatus, the control unit may change a length of time in which the circulation operation is continued in accordance with a length of time in which the power supply of the liquid ejection apparatus is off.

As the time in which the power supply is off becomes longer, the sedimentation of the liquid further progresses. Therefore, according to the above configuration, for example, as the time in which the power supply is off becomes longer, the control unit increases the time in which the circulation operation is continued. As a result, the sedimentation of the liquid is effectively eliminated.

(E) In the liquid ejection apparatus, the control unit may perform the circulation operation when a time elapsed from end of the previous circulation operation is equal to or longer than a threshold value.

When time elapses from the previous circulation operation, the sedimentation of the liquid progresses again. Therefore, according to the above configuration, the sedimentation of the liquid is effectively eliminated.

(F) In the liquid ejection apparatus, the control unit may perform the circulation operation after printing is ended when a time elapsed from the end of the previous circulation operation is equal to or longer than the threshold value during printing. According to the above configuration, since the printing is not interrupted by the circulation operation, the printing is smoothly performed.

(G) The liquid ejection apparatus may further include a display unit configured to display a time until the circulation operation ends.

According to the above configuration, the user can grasp the time required for the circulation operation. Thus, the user can effectively utilize the waiting time due to the circulation operation.

(H) The liquid ejection apparatus may further include a holding unit that attachably and detachably holds the medium, and the parallel operation may be a preparation operation for attaching and detaching the medium to and from the holding unit.

According to the above configuration, the user can attach and detach the medium to and from the holding unit in parallel with the circulation operation. Thus, the user can effectively utilize the waiting time.

(I) The liquid ejection apparatus may further include a maintenance unit configured to perform maintenance on the ejecting unit, the maintenance unit may include a contact member that comes into contact with liquid discharged from the ejecting unit, and the parallel operation may be a preparation operation for replacing the contact member. According to the above configuration, the user can replace the contact member in parallel with the circulation operation. Thus, the user can effectively utilize the waiting time.

(J) The liquid ejection apparatus may further include a maintenance unit configured to maintain the ejecting unit, and the parallel operation may be an operation in which the ejecting unit is retracted in order for a user to access the maintenance unit. When the user accesses the maintenance unit, the user's hand may interfere with the ejecting unit. Thus, according to the above configuration, the risk of the user's hand interfering with the ejecting unit is reduced by retracting the ejecting unit. Thus, the user can maintain, for example, the maintenance unit in parallel with the circulation operation.

(K) In the liquid ejection apparatus, the ejecting unit may be a first ejecting unit, the supply unit may be a first supply unit, the storage unit may be a first storage unit, the mounting unit may be a first mounting unit, and the supply flow path may be a first supply flow path, the liquid ejection apparatus may include a second ejecting unit configured to perform printing on the medium by ejecting liquid onto the medium and a second supply unit configured to supply liquid to the second ejecting unit, the second supply unit may include a second mounting unit to and from which a second storage unit configured to store liquid is attachable and detachable, and a second supply flow path configured to couple the second mounting unit and the second ejecting unit, and the control unit may perform, as the parallel operation, an operation other than the operation of performing printing by ejecting liquid from the first ejecting unit and the operation of attaching and detaching the first storage unit to and from the first mounting unit. According to the above configuration, since the parallel operation is performed in parallel with the circulation operation, the time required for the circulation operation can be effectively utilized. Thus, convenience for the user is further enhanced.

(L) In the liquid ejection apparatus, the parallel operation may be an operation of performing printing on the medium by ejecting liquid from the second ejecting unit onto the medium.

According to the above configuration, it is possible to perform printing by the second ejecting unit in parallel with the circulation operation. Thus, the user can effectively use the time required for the circulation operation.

(M) In the liquid ejection apparatus, when it is determined that the circulation operation ends until an operation of performing printing on the medium by ejecting liquid from the second ejecting unit onto the medium ends, the control unit may perform, as the parallel operation, an operation of performing printing on the medium by ejecting liquid from the second ejecting unit onto the medium.

In the liquid ejection apparatus, normally, the ejecting unit appropriately ejects liquid during printing in order to curb clogging of the nozzle. However, during the circulation operation, the first supply unit cannot supply the liquid from the first storage unit to the first ejecting unit. Therefore, when the second ejecting unit performs printing on the medium in parallel with the circulation operation, there is a possibility that the amount of liquid in the first ejecting unit may become very small by the first ejecting unit appropriately ejecting the liquid together with the second ejecting unit. In particular, as the time required for printing by the second ejecting unit becomes longer, the liquid in the first ejecting unit is further consumed. In this regard, according to the above configuration, when the circulation operation is ended until the printing by the second ejecting unit is ended, it is possible to supply the liquid from the first storage unit to the first ejecting unit after the circulation operation is ended. Therefore, it is possible to reduce the possibility that the amount of liquid in the first ejecting unit becomes small.

(N) A control method of a liquid ejection apparatus including an ejecting unit configured to eject liquid onto a medium to perform printing on the medium, and a supply unit configured to supply the liquid to the ejecting unit, the supply unit including a mounting unit to and from which a storage unit configured to store the liquid is attachable and detachable, a supply flow path configured to couple the mounting unit and the ejecting unit, a branching flow path configured to branch off from the supply flow path at a branching position and to merge with the supply flow path at a merging position downstream of a branching position in the supply flow path, and a pump located in the branching flow path and configured to cause the liquid to flow from the merging position toward the branching position in the branching flow path, the control method includes performing a circulation operation in which the liquid is circulated in the supply flow path and the branching flow path, and enabling execution of, as a parallel operation performed in parallel with the circulation operation, an operation other than an operation of performing printing by ejecting liquid from the ejecting unit and an operation of attaching and detaching the storage unit to and from the mounting unit. According to the above method, the effects similar to those of the liquid ejection apparatus described above can be exerted.

(O) The control method of the liquid ejection apparatus may further include performing the parallel operation selected by a user in parallel with the circulation operation.

According to the above method, the effects similar to those of the liquid ejection apparatus described above can be exerted.

(P) In the control method of the liquid ejection apparatus, the ejecting unit may be a first ejecting unit, the supply unit may be a first supply unit, the storage unit may be a first storage unit, the mounting unit may be a first mounting unit, and the supply flow path may be a first supply flow path, the liquid ejection apparatus may include a second ejecting unit configured to perform printing on the medium by ejecting liquid onto the medium and a second supply unit configured to supply liquid to the second ejecting unit, the second supply unit may include a second mounting unit to and from which a second storage unit configured to store liquid is attachable and detachable, and a second supply flow path configured to couple the second mounting unit and the second ejecting unit, and the control method of the liquid ejection apparatus may include performing, as the parallel operation, an operation other than the operation of performing printing by ejecting liquid from the first ejecting unit and the operation of attaching and detaching the first storage unit to and from the first mounting unit. According to the above method, the effects similar to those of the liquid ejection apparatus described above can be exerted.

What is claimed is:

1. A liquid ejection apparatus comprising:

an ejecting unit configured to eject liquid onto a medium to perform printing on the medium;

a supply unit configured to supply the liquid to the ejecting unit;

a holding unit configured to attachably and detachably hold the medium; and a control unit, wherein the supply unit includes:

a mounting unit to and from which a storage unit configured to store the liquid is attachable and detachable;

a supply flow path configured to couple the mounting unit and the ejecting unit;

a branching flow path configured to branch off from the supply flow path at a branching position and to merge with the supply flow path at a merging position downstream of the branching position in the supply flow path; and a pump located in the branching flow path and configured to cause the liquid to flow from the merging position toward the branching position in the branching flow path, the control unit performs a circulation operation that circulates the liquid in the supply flow path and the branching flow path, and is configured to perform, as a parallel operation that is performed in parallel with the circulation operation, an operation other than an operation of performing printing by ejecting the liquid from the ejecting unit and an operation of attaching and detaching the storage unit to and from the mounting unit, and the parallel operation is a preparation operation for attaching and detaching the medium to and from the holding unit.

2. The liquid ejection apparatus according to claim 1, further comprising a reception unit configured to receive selection of the parallel operation by a user, wherein the control unit performs the parallel operation received by the reception unit.

3. The liquid ejection apparatus according to claim 1, wherein the control unit performs the circulation operation when a power supply of the liquid ejection apparatus is turned on from off.

4. The liquid ejection apparatus according to claim 3, wherein the control unit changes a length of time in which the circulation operation is continued in accordance with a length of time in which the power supply of the liquid ejection apparatus is off.

5. The liquid ejection apparatus according to claim 1, wherein the control unit performs the circulation operation when a time elapsed from end of the previous circulation operation is equal to or longer than a threshold value.

6. The liquid ejection apparatus according to claim 5, wherein the control unit performs the circulation operation after printing is ended when a time elapsed from the end of the previous circulation operation is equal to or longer than the threshold value during printing.

7. The liquid ejection apparatus according to claim 1, further comprising a display unit configured to display a time until the circulation operation ends.

8. The liquid ejection apparatus according to claim 1, wherein the ejecting unit is a first ejecting unit, the supply unit is a first supply unit, the storage unit is a first storage unit, the mounting unit is a first mounting unit, the supply flow path is a first supply flow path, the liquid ejection apparatus includes:

a second ejecting unit configured to perform printing on the medium by ejecting liquid onto the medium; and a second supply unit configured to supply the liquid to the second ejecting unit, the second supply unit includes:

a second mounting unit to and from which a second storage unit configured to store liquid is attachable and detachable; and a second supply flow path configured to couple the second mounting unit and the second ejecting unit, and the control unit performs, as the parallel operation, an operation other than the operation of performing printing by ejecting liquid from the first ejecting unit and the operation of attaching and detaching the first storage unit to and from the first mounting unit.

9. A control method of a liquid ejection apparatus including an ejecting unit configured to eject liquid onto a medium to perform printing on the medium, a holding unit configured to attachably and detachably hold the medium, and a supply unit configured to supply the liquid to the ejecting unit, the supply unit including a mounting unit to and from which a storage unit configured to store the liquid is attachable and detachable, a supply flow path configured to couple the mounting unit and the ejecting unit, a branching flow path configured to branch off from the supply flow path at a branching position and to merge with the supply flow path at a merging position downstream of a branching position in the supply flow path, and a pump located in the branching flow path and configured to cause the liquid to flow from the merging position toward the branching position in the branching flow path, the control method comprising:

performing a circulation operation in which the liquid is circulated in the supply flow path and the branching flow path; and enabling execution of, as a parallel operation performed in parallel with the circulation operation, an operation other than an operation of performing printing by ejecting liquid from the ejecting unit and an operation of attaching and detaching the storage unit to and from the mounting unit, wherein the parallel operation is a preparation operation for attaching and detaching the medium to and from the holding unit.

10. The method according to claim 9, further comprising performing the parallel operation selected by a user in parallel with the circulation operation.

11. The method according to claim 10, wherein the ejecting unit is a first ejecting unit, the supply unit is a first supply unit, the storage unit is a first storage unit, the mounting unit is a first mounting unit, the supply flow path is a first supply flow path, the liquid ejection apparatus includes:

a second ejecting unit configured to perform printing on the medium by ejecting liquid onto the medium; and a second supply unit configured to supply liquid to the second ejecting unit, the second supply unit includes a second mounting unit to and from which a second storage unit configured to store liquid is attachable and detachable, and a second supply flow path configured to couple the second mounting unit and the second ejecting unit, and the control method of the liquid ejection apparatus includes performing, as the parallel operation, an operation other than the operation of performing printing by ejecting liquid from the first ejecting unit and the operation of attaching and detaching the first storage unit to and from the first mounting unit.

12. The method according to claim 10, wherein the ejecting unit is a first ejecting unit, the supply unit is a first supply unit, the storage unit is a first storage unit,
the mounting unit is a first mounting unit,
the supply flow path is a first supply flow path,
the liquid ejection apparatus includes:
a second ejecting unit configured to perform printing on the medium by ejecting liquid onto the medium; and
a second supply unit configured to supply liquid to the second ejecting unit,
the second supply unit includes
a second mounting unit to and from which a second storage unit configured to store liquid is attachable and detachable, and
a second supply flow path configured to couple the second mounting unit and the second ejecting unit, and
the control method of the liquid ejection apparatus includes performing, as the parallel operation, an operation other than the operation of performing printing by ejecting liquid from the first ejecting unit and the operation of attaching and detaching the first storage unit to and from the first mounting unit.

* * * * *